July 8, 1969     M. L. SUMMERLAND     3,454,057
SAWMILL DRIVE MEANS
Filed Aug. 15, 1966
FIG. 1
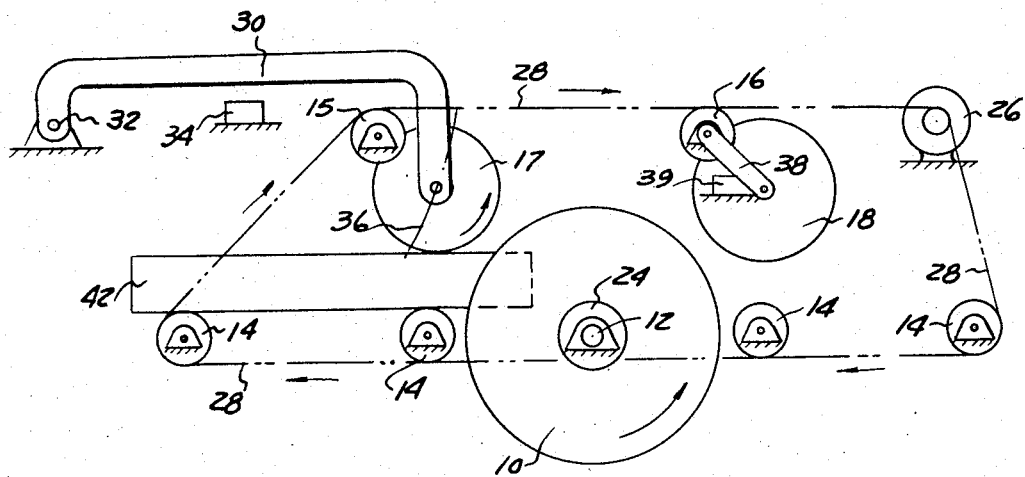
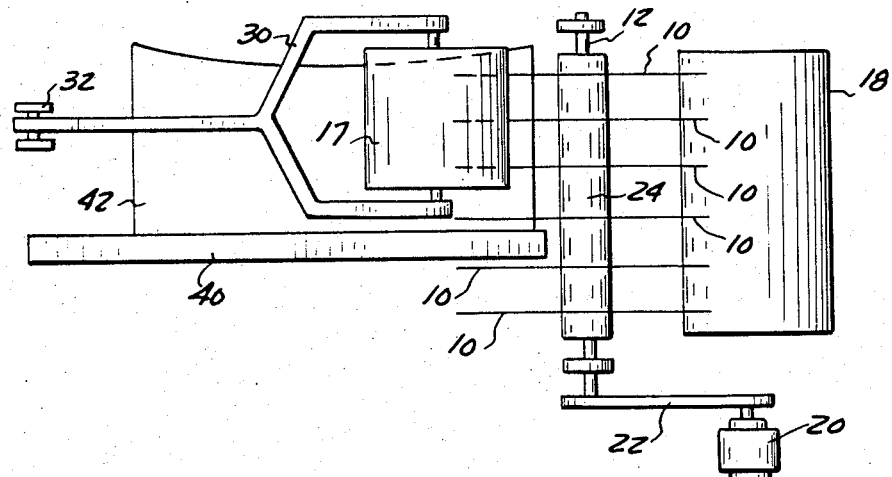
FIG. 2
INVENTOR
MELVIN L. SUMMERLAND
BY *Cullen, Sloman, & Cantor*
ATTORNEYS 3,454,057
SAWMILL DRIVE MEANS
Melvin L. Summerland, Johannesburg, Mich.
(Rte. 4, Box 323, Gaylord, Mich. 49735)
Filed Aug. 15, 1966, Ser. No. 572,581
Int. Cl. B27b 25/02
U.S. Cl. 143—56     3 Claims

ABSTRACT OF THE DISCLOSURE

The means for driving a cant into and through a multiple disc saw comprises a normally non-rotating vertically shiftable resilient rubber wheel located above the cant supporting surface. A cant being fed into the saws cams the rubber wheel upwardly into frictional engagement with a rotating drive wheel, thus imparting a driving force to the rubber wheel which is transmitted to the cant.

Background of the invention

This invention relates generally to sawmills and more particularly to sawmills having multiple disc saws.

When a piece of semi-rough lumber, known as a cant, is fed into a multiple disc saw to be cut into smaller boards, it is essential that means be provided to firmly and accurately guide and control the cant as it moves into and through the saws. This is essential not only for accuracy but for safety as well.

Accordingly, it is an object of this invention to provide an improved feed and control means for driving a cant into and through a multiple disc sawmill.

It is a further object of this invention to provide an improved feed means for a multiple disc sawmill which applies a clamping and feeding pressure which is proportional to the thickness of the cant to be cut, and which is self-adjusting.

These and other objects of this invention will become apparent from the following specification when considered in conjunction with the accompanying drawings.

Brief description of the drawing

FIG. 1 is a simplified side elevation of a sawmill embodying the feed mechanism of this invention.

FIG. 2 is a plan view illustrating a portion of the mechanism of FIG. 1.

Detailed description of the invention

Referring now to FIG. 1 in particular, there is illustrated one of a set of parallel disc saws 10 mounted on a common arbor 12. The feed mechanism generally comprises a plurality of lower drive rollers 14 mounted at a common elevation, upper drive rollers 15 and 16, and upper drive wheels 17 and 18.

Drive rollers 14, 15 and 16 are preferably fabricated of a smooth and hard material, such as steel. In contrast, drive wheels 17 and 18 must be resilient and radially deformable. A preferred material would be a conventional synthetic rubber pneumatic tire. Such a product has the added advantage of a tread to increase the coefficient of friction.

Power for the saws is supplied by a saw drive motor 20 which is connected to the saw arbor 12 by a driving belt or chain 22. The individual saws 10 are separated on arbor 12 by spacing collars 24 (see FIG. 2) which may be readily changed to provide any desired width of cut.

Power for the feed is provided by feed motor 26. A common driving chain 28 is provided to supply driving power to lower drive rollers 14 and to upper drive rollers 15 and 16. Rollers 15 and 16 in turn supply rotary drive motion to drive wheels 17 and 18, respectively, in a manner to be described hereinafter. Drive wheel 17 is rotatably mounted upon a supporting yoke 30, which in turn is pivotally secured to a fixed frame at pivot point 32. A stop 34 is provided to limit the downward motion of yoke 34 as it travels along arc 36.

The relative position of point 32, the longitudinal axis of roller 15 and arc 36 must be such that upward movement of wheel 17 carries it closer to wheel 15, to increase the compression of wheel 17.

Drive wheel 18 is rotatably mounted on yoke 38 which pivots about the axis of drive roller 16. A stop 39 limits the downward movement of wheel 18.

As can be seen in FIG. 2, an adjustable face plate 40 provides a side guide against which cant 42 slides and abuts as it is fed from left to right toward the saws. A cant is normally squared on three sides, that is, top and bottom and the side abutting face plate 40.

Operation

The first step in operation is to establish the desired width of cut by mounting appropriate spacing collars 24 between each of the adjacent saws 10. Next, face plate 40 is adjusted laterally (upwardly or downwardly as viewed in FIG. 2) until the first saw (the uppermost saw of FIG. 2) is so positioned relative to cant 42 that it will provide a continuous cut through the full length of the cant, which cut will not be interrupted by any hollows or bellies present in the irregular unfinished upper (as viewed in FIG. 2) face of the cant. In this manner. the danger of flying splinters formed by a discontinuous cut by No. 1 saw is avoided.

Once the saws and face plate have been adjusted to the desired setting, the cant may be placed on the lower drive rollers 14 to the left of the saws, as viewed in FIG. 1. The cant is then manually pushed forward toward the saws until it engages drive wheel 17. Wheel 17 is normally non-rotating, since it is out of engagement with upper drive wheel 15, the force of gravity holding it down against stop 34. As cant 42 is pushed with further force into wheel 17, the wheel is deflected forward and upward along arc 36 into engagement with upper drive wheel 15. Further pressure produces a radial compression and deflection of the periphery of wheel 17, both at the point of contact with upper drive roller 15 and at the area of contact with the upper face of cant 42. This deflection serves several functions. First, it provides greater contact area between drive roller 15 and wheel 17, thereby increasing the driving force which can be transmitted from roller 15 to wheel 17. Secondly, a similar effect is produced at the interface between wheel 17 and cant 42, so that a greater driving force may be employed to force cant 42 into the saws. A still third function is that the radial deflection and compression of wheel 17 produces a downward clamping force against the cant, so that accurate alignment and control of the cant as it passes into and through the saws may be achieved.

This compression of wheel 17 thus provides a clamping and guiding force which is proportional to the thickness of the cant, providing the greater forces necessary for thicker cants. Furthermore, it is simple and self-adjusting in operation.

As the cant passes through the saws, it engages the wheel 18. Wheel 18 is normally in a radially compressed condition, it being held against roller 16 by yoke 38. Wheel 18 functions to pull the cant completely through the saws, its own weight maintaining it in contact with cant. It will be noted from FIG. 2 that wheel 18 is wider than the total width of the six disc saws. This is necessary so that each of the now severed planks, which are no longer interconnected after passing through the saws, will be sequeezed between wheel 18 and lower drive rollers 14, so that control is maintained at all times. In contrast, roller 17 need not be as wide, since it need only be wide enough to provide sufficient driving force to force the cant into and through the saws.

Wheel 18 also functions to prevent warpage of the partially severed planks, which warpage tends to interfere with the accuracy of the still-in-progress cut. Therefore, the need for supplementary devices such as log-splitters behind each saw is eliminated.

Thus, the guide and feed means of this invention provides full control of the cant as it passes into and through the multiple disc saws. This is advantageous for several reasons. First, it is desirable from a safety standpoint that control be provided for each of the individual planks after they pass through the saws, so that flying planks or splinters will be avoided. Secondly, the compressible upper drive wheels are an extremely simple and economical means for providing firm clamping and driving force which is proportional to the thickness of the cant.

An additional safety feature arises from the fact that it takes about 20 pounds force to start the cant into drive wheel 17, so that a cant will not accidentally be fed into the saws.

This invention may be further developed within the scope of the following claims. Accordingly, it is to be understood that the above description is to be interpreted as illustrative of only a single operative embodiment of this invention, rather than in a strictly limited sense.

I now claim:
1. In a sawmill characterized by a power driven saw, the improved feeding means for driving and guiding a piece of wood to and through said saw which comprises:
   a plurality of horizontal, parallel rollers having their respective axes perpendicular to the direction of feed, said rollers forming a table extending in both directions from said saw and over which a workpiece to be cut may be fed;
   radially compressible and deformable wheel means disposed above said table-forming rollers and parallel therewith, the normal height of said deformable wheel means being adjustable to an elevation below the upper edge of a workpiece to be cut;
   biasing means for continuously biasing said deformable wheel means downwardly towards said table-forming rollers;
   and driving means including an upper driving roller having its axis parallel to the axis of said deformable wheel means and disposed above said deformable wheel means such that there is normally no contact therebetween;
   and compressible and deformable wheel means being so positioned as to be cammed upwardly by a workpiece being fed towards the saw until it engages said upper driving roller, thereby radially compressing said wheel means against said upper driving roller and against the workpiece, thereby providing rotary driving motion to said deformable wheel means to force the workpiece through the saw.

2. The feeding means to claim 1, wherein said deformable wheel means comprises a pneumatic tire.

3. The feeding means of claim 1, wherein said deformable wheel means comprises a first wheel disposed ahead of said saw to push the workpiece through the saw, and a second wheel disposed behind said saw to pull the workpiece through the saw.

References Cited
UNITED STATES PATENTS

| | | | |
|---|---|---|---|
| 1,295,875 | 3/1919 | Eaglesfield | 144—246 |
| 1,437,843 | 12/1922 | Heinrichs. | |
| 3,275,045 | 9/1966 | Beeley | 143—37 |

FOREIGN PATENTS

| | | |
|---|---|---|
| 1,050,533 | 2/1959 | Germany. |
| 105,038 | 7/1942 | Sweden. |

WILLIAM S. LAWSON, *Primary Examiner.*

U.S. Cl. X.R.

144—246